United States Patent [19]

Umino

[11] 4,014,169
[45] Mar. 29, 1977

[54] ANTI-AFTERBURN DEVICE FOR ENGINE HAVING AIR PUMP

[75] Inventor: Hideo Umino, Nagaokakyo, Japan

[73] Assignee: Mitsubishi Jidosha Kogyo Kabushiki Kaisha, Tokyo, Japan

[22] Filed: Apr. 7, 1975

[21] Appl. No.: 565,966

[52] U.S. Cl. .............................. 60/290; 123/97 B
[51] Int. Cl.² ....................................... F02B 75/10
[58] Field of Search ............. 60/290, 289; 123/97 B

[56] References Cited

UNITED STATES PATENTS

| | | | |
|---|---|---|---|
| 3,256,870 | 6/1966 | Walker | 123/97 B |
| 3,470,855 | 10/1969 | Von Seggern | 123/97 B |
| 3,591,961 | 7/1971 | Woodward | 60/290 |
| 3,805,522 | 4/1974 | Sheppard | 60/290 |
| 3,818,702 | 6/1974 | Woo | 60/290 |
| 3,849,984 | 11/1974 | Toda | 60/290 |
| 3,888,080 | 6/1975 | Nohira | 60/290 |
| 3,906,723 | 9/1975 | Matumoto | 60/290 |
| 3,919,843 | 11/1975 | Arnaud | 60/289 |
| 3,931,710 | 1/1976 | Hartel | 60/290 |

*Primary Examiner*—Douglas Hart
*Attorney, Agent, or Firm*—Oldham & Oldham Co.

[57] ABSTRACT

An anti-afterburn device for an engine having an air pump, comprising two chambers defined within a housing by a pressure differential piston and a control valve connected to the piston. An intake manifold of the engine is connected to the chambers, at least one of which is connected to the intake manifold through an orifice and an electrically-operated three-way valve so as to operate the control valve through the piston when abrupt pressure change in said manifold is occured or when the three-way valve is energized to communicate the one chamber with a pressure source.

6 Claims, 6 Drawing Figures

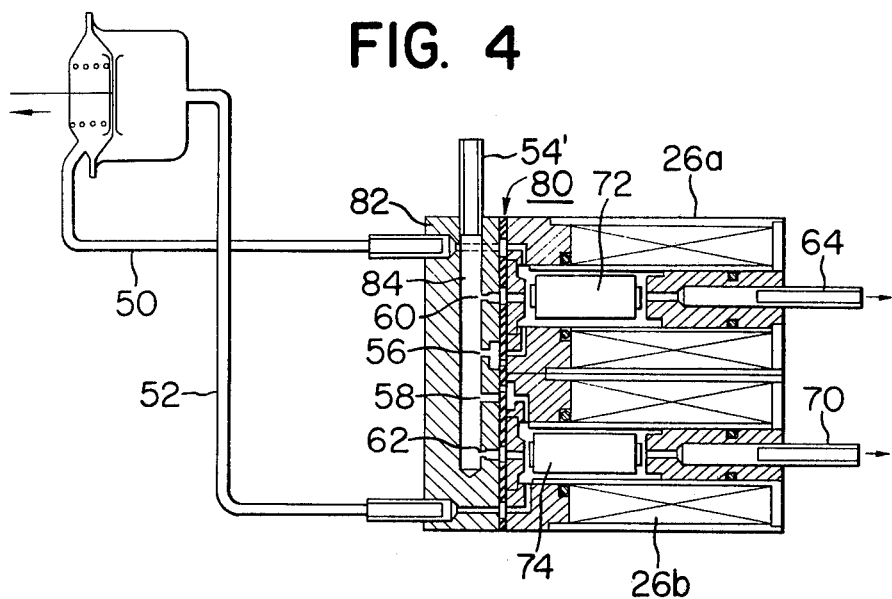
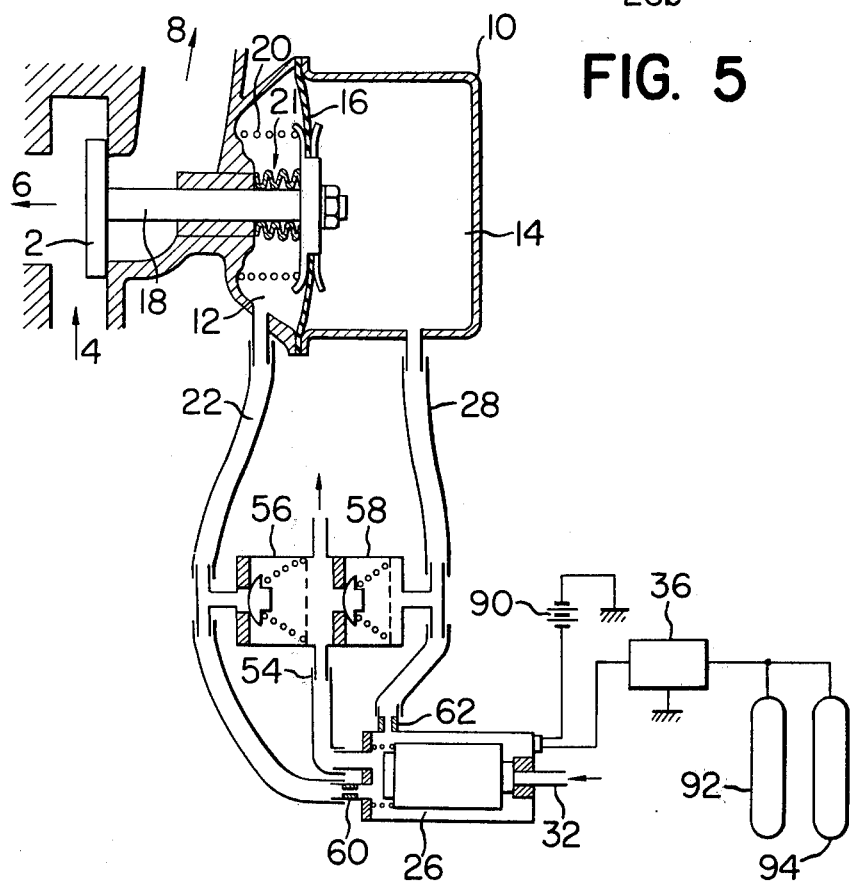

4,014,169

ANTI-AFTERBURN DEVICE FOR ENGINE HAVING AIR PUMP

BACKGROUND OF INVENTION

This invention relates to an anti-afterburn device for an engine of a vehicle in which secondary air is supplied to an exhaust manifold of the engine for purifying exhaust gas.

In order to purify the exhaust gas, it has been known that secondary air is supplied to thermal reactors or catalytic convertors to reburn positively unburned gas to be discharged from the engine before it is discharged into the atmosphere. In this case, if the exhaust gas containing a large amount of unburned gas is discharged from the engine to the exhaust manifold, it reacts with the secondary air within the reactor or convertor, thereby causing an explosion or afterburn. When a throttle valve of a carburetor is opened or closed rapidly, richer air-fuel mixture is supplied to the engine and not burned completely in a combustion chamber thereof, so that said gas containing the unburned gas is discharged into said exhaust manifold to increase the generation of afterburn.

In conventional technics relating to anti-afterburn, there has been provided devices in which the supply of secondary air is terminated or fresh air is supplied to an intake manifold upon deceleration. However, in these devices, delay of operation thereof is occurred and due to this delay the after-burn is generated by the secondary air supplied before the deceleration.

To this end, we have proposed a device in which the supply of secondary air is interrupted for few seconds just after abrupt acceleration or deceleration to prevent the afterburn of the engine. This device comprises two chambers defined within a housing by a diaphragm by which a spring is positioned substantially perpendicular to a surface of the diaphragm, one of said chambers being connected to a conduit through an orifice and the other being connected directly to another conduit, or each of said chambers being connected to a conduit through an orifice and a check valve, said conduits being connected to an intake manifold, an acceleration sensor operated by a boost pressure in said intake manifold, and an air control valve actuated by an operation of said acceleration sensor and adapted to open and close a secondary air supply conduit for an engine having an air pump, the supply of the secondary air to an exhaust pipe for the engine being interrupted to prevent an afterburn when a throttle valve is opened or closed abruptly.

SUMMARY OF THE INVENTION

An object of this invention is to provide an anti-afterburn device in which it is more compacted than our aforementioned anti-afterburn device and also the air control valve is closed by operation of an atmospheric temperature sensor or a high temperature sensor through a separate system pressure including atmospheric pressure.

An anti-afterburn device according to the invention is characterized by that a conduit communicating to at least one of two chambers separated by a pressure differential piston means within a housing is communicated selectively with the separate system pressure, and the pressure within said one chamber is varied by said separate system pressure to operate the control valve connected to said piston means, thereby interrupting or decreasing the supply of secondary air or fuel to prevent the afterburn of the engine.

BRIEF DESCRIPTION OF THE DRAWINGS

This invention will be explained with reference to the accompanying drawings in which;

FIG. 4 is a diagrammatic view of a modification of FIG. 3, FIG. 5 is a diagrammatic view of a further embodiment of the anti-afterburn device according to the invention.

DESCRIPTION OF THE PREFERRED EMBODIMENTS

Figure 1:
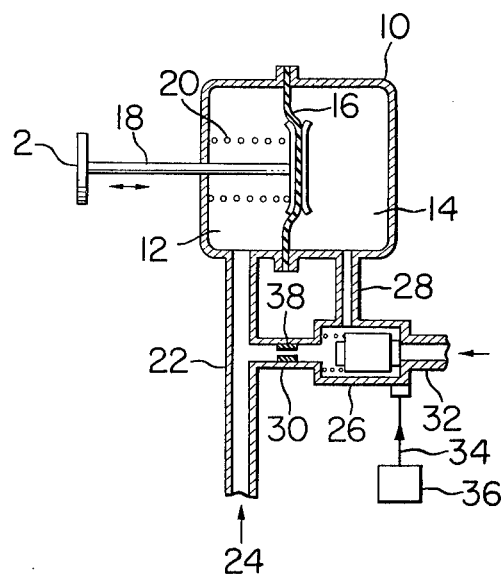
FIG. 1 is a diagrammatic view of the anti-afterburn device according to the invention.

Referring to FIG. 1, an anti-afterburn device includes a control valve 2. In this embodiment, this control valve 2 regulates air supply from an air pump (not shown) to a thermal reactor (not shown). The control valve 2 is connected through a rod 18 to a diaphragm 16 which divides a housing 10 into the chambers 12 and 14. A spring 20 is located between a wall surface of the chamber 12 and the diaphragm 16 and urges the valve 2 to the right in FIG. 1 when pressures in the chambers 12 and 14 are equal.

The chamber 12 is directly connected to an intake manifold 24 through a conduit 22. The chamber 14 is connected to a conduit 28 extending from a three-way solenoid valve 26. The three-way solenoid valve 26 is connected to a conduit 30 branched from the conduit 22 and a conduit 32 communicating to the output pressure of an air pump, not shown. Either of these conduits 30 and 32 is adapted to communicate with the conduit 28. In deenergized condition of the solenoid valve as shown in FIG. 1, the conduit 32 is closed while the conduits 30 and 28 are communicated to each other. When the solenoid valve 26 is energized by a controller 36 through a lead 34, the valve 26 is excited to close the conduit 30 and to permit communication between the conduits 28 and 32. The conduit 30 is provided with an orifice 38, such as a slit or narrow opening.

The operation of the embodiment shown in FIG. 1 will be explained. If the negative pressure in the intake manifold 24 changes rapidly upon abrupt deceleration, the chamber 12 is effected directly by this pressure change to raise the pressure in the chamber 12. The chamber 14 receives the pressure rise since the chamber 14 is in communication with this pressure change through the orifice 38. Therefore, a pressure difference is produced between the chambers 12 and 14 upon initial abrupt deceleration, thereby moving the diaphragm 16 and the control valve 2 connected thereto. This movement of the control valve 2 interrupts the air supply to the thermal reactor to prevent the generation of afterburn of the engine. When the pressures in the chambers 12 and 14 become equal after a period of time, diaphragm 16 and the control valve 2 return to their original positions.

Also, when a high temperature sensor for sensing temperature in the thermal reactor and an atmospheric temperature sensor, not shown, detect abnormal conditions, the controller 36 is operated to energize the three-way solenoid valve 26. Thus, the solenoid valve 26 is excited to close the conduit 30 and to connect the conduit 28 with the conduit 32, thereby communicating an output high pressure from the pump to the chamber 14 to operate the control valve 2.

Figure 2:
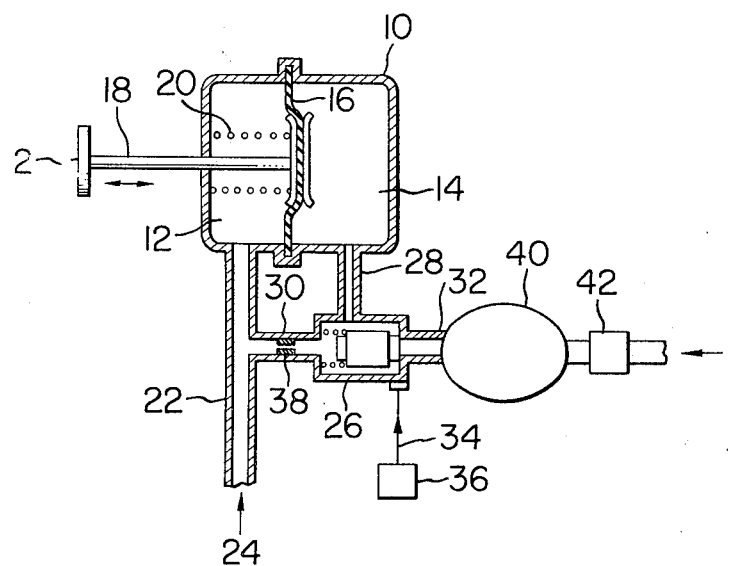
FIG. 2 is a diagrammatic view of a modification of FIG. 1.

FIG. 2 shows a modification of the embodiment shown in FIG. 1. This embodiment is almost same as the first embodiment except that it is provided with a pressure reservoir or accumulator 40 and a check valve 42 in the conduit 32 of the device shown in FIG. 1 to stabilize the output pressure from the air pump. The anti-afterburn device of this embodiment operates as hereinbefore described with reference to the first embodiment.

Figure 3:
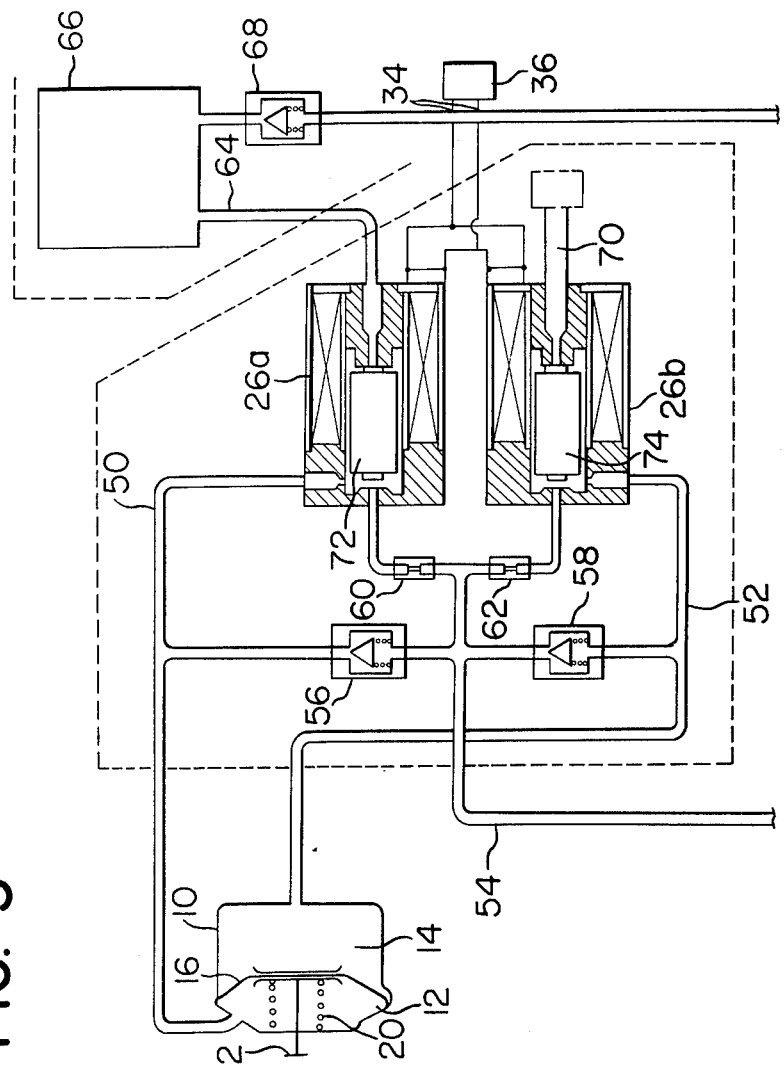
FIG. 3 is a diagrammatic view of another embodiment of the anti-afterburn device according to the invention.

FIG. 3 shows a second embodiment. In the anti-afterburn devices shown in FIGS. 1 and 2, the control valve 2 is operated in a given direction only when the base pressure raises or drops rapidly. The embodiments shown in FIGS. 3 to 6 are so arranged that the control valve is operated into a desired direction upon both rapid raise and drop of the base pressure.

In FIG. 3, a three-way solenoid valves 26a and 26b are electrically connected parallel to the controller 36 through the leads 34. The solenoid valve 26a is connected to the chamber 12 in the housing 10 through a conduit 50, while the solenoid valve 26b is connected to the chamber 14 through a conduit 52.

A conduit 54 connected to the intake manifold is bypassed to the conduits 50 and 52 through check valves 56 and 58 respectively. Also, the conduit 54 is connected to the three-way solenoid valves 26a and 26b through orifices 60 and 62 respectively. As shown in FIG. 3, the check valve 56 permits the fluid communication from the conduit 50 to the conduit 54, while the valve 58 permits the fluid flow from the conduit 54 to the conduit 52. Another passage of the three-way solenoid valve 26a is connected to a conduit 64 in which a reservoir 66 and check valve 68 are provided as shown in FIG. 3. Another passage of the solenoid valve 26b is opened to atmosphere or communicated to the output of the air pump by conduit 70.

Each plunger 72, 74 of the three-way solenoid valves 26a and 26b moves to the right in FIG. 3 to close the conduit 64, 70 and to permit communication between the conduit 50, 52 and the conduit 54 passing through the orifice 60, 62 when they are deenergized. The plungers 72 and 74 close the conduit 54 and communicate the conduits 50 and 52 with the conduits 64 and 70, respectively, when the valves are energized.

In operation, when the boost negative pressure in the intake manifold is decreased rapidly upon abrupt acceleration, the pressure in the chamber 12 is reduced rapidly through the conduit 54, the check valve 56 and the conduit 50. On the other hand, the pressure in the chamber 14 is reduced gradually through the orifice 62 since the check valve 58 is closed and prevents air communication. Thus, at the first stage the diaphragm 16 and the control valve 2 move to the left in FIG. 3 to terminate air supply to the thermal reactor, thereby preventing the generation of the afterburn.

When the boost negative pressure in the intake manifold is increased rapidly upon the abrupt deceleration, the chamber 14 is pressurized through the conduit 54, the check valve 58 and the conduit 52. On the other hand, the chamber 12 is only pressurized progressively through the orifice 60 since the check valve 56 prevents air flow therethrough. Therefore, as described hereinbefore, the diaphragm 16 and the control valve 2 are moved to the left in FIG. 3 for the initial few seconds after pressure change to establish the same effect.

When the controller 36 energizes the three-way solenoid valves 26a and 26b through the leads 34 by operation of an atmospheric temperature sensor or high temperature sensor not shown, the plungers 72 and 74 are moved to the left in FIG. 3 to communicate between the conduits 70 and 52, thereby permitting the communication of the atmosphere or the air pump output to the chamber 14. At this time, the chamber 12 is communicated through the conduits 50 and 64 to the reservoir 66 storing the negative pressure in the intake manifold, so that the pressure in the chamber 12 is lower than that in the chamber 14. Therefore, the control valve 2 is moved to the left in FIG. 3 to terminate the air supply to the thermal reactor, thereby preventing the afterburn. However, in this case, the diaphragm 6 and the control valve 2 will not be returned to their normal positions after the initial few seconds as described above, but are retained in their moved positions until the solenoid valves 26a and 26b are deenergized.

FIG. 4 shows another embodiment of the anti-afterburn device which is made more compact than that shown in FIG. 3 and which includes a four way valve means. As the operation of this embodiment is same as that of the embodiment shown in FIG. 3, the construction shown in FIG. 4 will only be explained herein.

A conduit 54' communicated to the intake manifold is connected to a passage 84 provided in a head 84 which is secured to the heads of the three-way solenoid valves 26a and 26b through a rubber seat 80. The passage 84 communicates with the solenoid valves 26a and 26b through the orifice 60 and the check valve 56 parallel thereto and through the orifice 62 and the check valve 58 parallel thereto respectively. Thus, when the three-way valves 26a and 26b are energized by the controller not shown, the orifices 60 and 62 communicating to the passage 84 are closed by the plungers 72 and 74, thereby communicating the conduits 50 and 52 with the conduits 64 and 70 respectively.

FIG. 5 shows a third embodiment of this invention. This embodiment is made further compact than the aforementioned embodiment.

Referring to FIG. 5, numeral 2 is a control valve which diverts air from an air pump 4 to either a thermal reactor 6 or a relief passage 8. The valve 2 is connected through a rod 18 to a diaphragm 16 separating a housing 10 into two chambers 12 and 14. Between a side wall of the chamber 12 and the diaphragm 16, a spring 20 and a boot 21 are located to urge the valve 2 toward the right in FIG. 6 upon balancing of pressures in the chambers 12 and 14 and to prevent leakage of the air from the chamber 12. The chambers 12 and 14 are connected to conduits 22 and 28 respectively. The conduits 22 and 28 are connected to a three-way solenoid valve 26, and connecting portions therebetween are provided with orifices 60 and 62 respectively. T' ɔ solenoid valve 26 is communicated to the intake manifold of the engine through a conduit 54 and opened to the output pressure of the air pump, exhaust pressure or atmosphere through a conduit 32. The solenoid valve 26 is adapted to close the conduit 32 to permit communication between the conduits 22, 28 and 54, when it is deenergized, as shown in FIG. 5. Upon energization of the valve 26, it closes the conduits 54 and 22 and connects between the conduits 28 and 32.

The energization of the solenoid valve 26 is effected by a battery 90 only when the controller 36 is operated. The controller 36 is actuated by operations of a vehicle speed sensor 92 and a temperature sensor 94.

In brief explanation of operation, when the boost negative pressure in the intake manifold is rapidly decreased, the pressure in the chamber 12 is also reduced through the check valve 56 and the conduit 54, resulting the termination of the air supply to the thermal reactor 6. After passing a period of time, the pressure in the chamber 14 is also reduced through the conduit 54, the orifice 62 and the conduit 28, thereby equalizing the pressures in the chambers 12 and 14 to return the valve 2 to its original position shown in FIG. 5. When the boost negative pressure is increased rapidly, the chamber 14 is pressurized through the check valve 58 and the conduit 28, so that the valve 2 closes the air supply to the thermal reactor 6 to prevent the afterburn of the engine.

When the controller 36 energizes the solenoid valve 26 upon the operation of the speed sensor 92 or the temperature sensor 94, the output pressure of air pump, the exhaust pressure or the atmospheric pressure is communicated to the chamber 14 through the conduit 32, the orifice 62 and the conduit 28 to operate the valve 2. In this case, the valve is retained to close the air supply to the thermal reactor 6 unless the solenoid valve 26 is deenergized.

Figure 6:
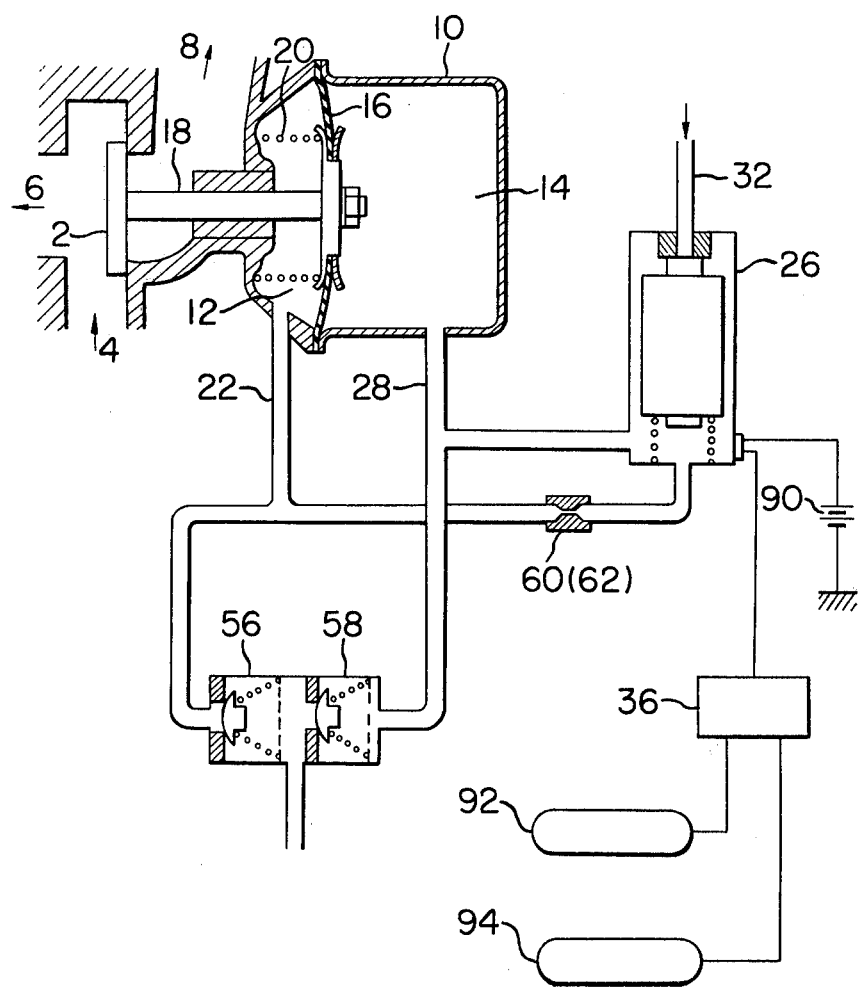
FIG. 6 is a diagrammatic view of a modification of FIG. 5.

An embodiment shown in FIG. 6 is a modification of the embodiment shown in FIG. 5 and it will be understood that this embodiment can effect the same operation as the device shown in FIG. 5.

According to this invention, the anti-afterburn device can effect the separate system pressure to the control system of secondary air supply by the operation of the vehicle speed sensor or temperature sensor, thereby terminating the supply of secondary air at any desired occasion.

Various changes and modifications may be made to this invention without departing from a scope thereof.

What is claimed is:

1. An anti-afterburn device for an engine having an air pump, comprising a control valve for controlling air supply, a pressure differential means dividing a housing into first and second chambers and being connected to said control valve, a spring urging said control valve in one direction, first and second conduits connecting respectively said chambers with an intake manifold of the engine, a first orifice provided in one of said conduits, a separate air pressure source, and a first three-way valve provided in said first conduit and connected to said first chamber to urge the pressure differential means opposite to that of the spring by supply of an air pressure to the first chamber, said first three-way valve being adapted to selectively supply an intake manifold negative pressure or the air pressure from the separate pressure source into said first chamber, said control valve being operable to reduce the air supply upon abrupt pressure change in said intake manifold or upon supply of the air pressure from the separate pressure source, said first orifice being provided in said second conduit, and a first check valve is located in parallel with said first orifice, said check valve permitting a communication only from said second chamber to the intake manifold.

2. An anti-afterburn device for an engine having an air pump, comprising a control valve for controlling air supply, a pressure differential means dividing a housing into first and second chambers and being connected to said control valve, a spring urging said control valve in one direction, first and second conduits connecting respectively said chambers with an intake manifold of the engine, a first orifice provided in one of said conduits, a separate air pressure source, and a first three-way valve provided in said first conduit and connected to said first chamber to urge the pressure differential means opposite to that of the spring by supply of an air pressure to the first chamber, said first three-way valve being adapted to selectively supply an intake manifold negative pressure or the air pressure from the separate pressure source into said first chamber, said control valve being operable to reduce the air supply upon abrupt pressure change in said intake manifold or upon supply of the air pressure from the separate pressure source, said first orifice being provided in said first conduit and said first three-way valve is located in said first conduit between said orifice and said first chamber, a first check valve located in parallel with said first orifice, said check valve permitting a communication only from the intake manifold to the first chamber, and a second orifice provided in said second conduit, a second check valve located in parallel with said second orifice, said second check valve permitting a communication only from said second chamber to the intake manifold.

3. An anti-afterburn device according to claim 2, wherein a second three-way valve is located in series with said second orifice and is in parallel with said second check valve, said second three-way valve being adapted to selectively communicate between the intake manifold and the second chamber via a reservoir tank and a check valve arranged in series or between the second orifice and the second chamber and being operated with said first three-way valve.

4. An anti-afterburn device according to claim 3, wherein each three-way valve is a solenoid valve and is controlled by a controller actuated by a sensor means.

5. An anti-afterburn device for an engine having an air pump, comprising a control valve for controlling air supply, a pressure differential means dividing a housing into first and second chambers and being connected to said control valve, a spring urging said control valve in one direction, first and second conduits respectively connected to said first and second chambers, a separate air pressure source, a four-way valve means connected to said first conduit and communicating with said first chamber for supply of an air pressure to the first chamber to urge the pressure differential means in a direction opposite to that of the spring, said four-way valve means also being connected to said second conduit, to a third conduit which is connected to an intake manifold and to a fourth conduit which is in communication with the air pressure from said separate pressure source, first and second check valves respectively provided in by-pass passages communicating said third conduit with said first conduit and with said second conduit, and first and second orifices provided in said first conduit and said second conduit between said four-way valve means and said by-pass passages respectively, said four-way valve means being operated selectively to one position in which a communication between said first, second and third conduits is permitted but closing said fourth conduit and to the other position in which a communication between said first and fourth conduits is permitted but closing said second and third conduits.

6. An anti-afterburn device according to claim 5, wherein said four-way valve means is a solenoid valve and is controlled by a controller actuated by an atmospheric temperature sensor, a high temperature sensor or a speed sensor.

* * * * *